(12) United States Patent
Eaton et al.

(10) Patent No.: US 6,730,752 B2
(45) Date of Patent: *May 4, 2004

(54) METHODS FOR FORMING AMORPHOUS ULTRA-HIGH MOLECULAR WEIGHT POLYOLEFINS AND DRAG REDUCING COMPOSITIONS COMPRISING AMORPHOUS ULTRA-HIGH MOLECULAR WEIGHT POLYOLEFINS

(75) Inventors: Gerald B. Eaton, Houston, TX (US); Michael J. Monahan, Katy, TX (US); Robert J. Tipton, Tulsa, OK (US)

(73) Assignee: Energy & Environmental International, L.C., Brookshire, TX (US)

( * ) Notice: Subject to any disclaimer, the term of this patent is extended or adjusted under 35 U.S.C. 154(b) by 331 days.

This patent is subject to a terminal disclaimer.

(21) Appl. No.: 09/760,544

(22) Filed: Jan. 16, 2001

(65) Prior Publication Data

US 2001/0002389 A1 May 31, 2001

Related U.S. Application Data (63) Continuation of application No. 09/081,964, filed on May 20, 1998, now Pat. No. 6,015,779, which is a continuation-in-part of application No. 08/619,840, filed on Mar. 19, 1996, now Pat. No. 5,869,570.

(51) Int. Cl.[7] .......................... C08F 4/42; C08F 210/00
(52) U.S. Cl. .................. 526/124.3; 526/348; 526/97; 526/90; 502/103; 502/128
(58) Field of Search .................. 526/348, 124.3, 526/97, 90; 502/103, 128

(56) References Cited

U.S. PATENT DOCUMENTS

| | | | |
|---|---|---|---|
| 3,354,139 A | * 11/1967 | Vandenberg | 260/94.9 |
| 3,542,044 A | 11/1970 | Hanson et al. | |
| 3,645,822 A | 2/1972 | Widiger et al. | |
| 3,669,948 A | 6/1972 | Konotsune et al. | |
| 3,692,676 A | 9/1972 | Cutler et al. | |
| 3,730,275 A | 5/1973 | McClafin et al. | |
| 3,736,288 A | 5/1973 | Stratta et al. | |
| 3,767,561 A | 10/1973 | Rossi et al. | |
| 3,791,913 A | 2/1974 | Ver Strate et al. | |
| 3,843,589 A | 10/1974 | Wartman | |
| 3,857,795 A | 12/1974 | Van Der Bend et al. | |
| 3,884,252 A | 5/1975 | Kruka | |
| 3,944,529 A | 3/1976 | Creemers | |
| 3,951,935 A | 4/1976 | Engelmann | |
| 4,057,680 A | 11/1977 | Yamazaki et al. | |
| 4,142,991 A | 3/1979 | Arzoumanidis et al. | |
| 4,147,677 A | 4/1979 | Lundberg et al. | |
| 4,190,069 A | 2/1980 | Krantz | |
| 4,212,312 A | 7/1980 | Titus | |
| 4,262,104 A | 4/1981 | Wristers | |
| 4,263,926 A | 4/1981 | Drake et al. | |
| 4,267,292 A | 5/1981 | Benton et al. | |
| 4,282,114 A | 8/1981 | Ito et al. | |
| 4,289,679 A | 9/1981 | Mack | |
| 4,294,947 A | 10/1981 | Doerk et al. | |
| 4,329,253 A | 5/1982 | Goodall et al. | |
| 4,333,488 A | 6/1982 | McClaflin | |
| 4,335,964 A | 6/1982 | Drake et al. | |
| 4,340,076 A | 7/1982 | Weitzen | |
| 4,358,572 A | 11/1982 | Mack et al. | |
| 4,371,455 A | 2/1983 | Mack et al. | |
| 4,384,089 A | * 5/1983 | Dehm | 526/159 |
| 4,393,182 A | 7/1983 | Goodall et al. | |
| 4,395,358 A | 7/1983 | Wristers | |
| 4,415,714 A | 11/1983 | Mack | |
| 4,426,317 A | 1/1984 | Rogers | |
| 4,433,123 A | 2/1984 | Mack | |
| 4,478,951 A | 10/1984 | Huff | |
| 4,485,186 A | 11/1984 | Ueno et al. | |
| 4,493,903 A | * 1/1985 | Mack | |
| 4,493,904 A | 1/1985 | Mack | |

(List continued on next page.)

FOREIGN PATENT DOCUMENTS

| | | |
|---|---|---|
| CA | 901727 | 5/1972 |
| EP | 0005215 A | 11/1979 |

(List continued on next page.)

OTHER PUBLICATIONS

English Language Abstract of Japanese patent application entitled "Preparation of Ethylene–Alpha–Olefin Copolymer," dated May 14, 1990.

(List continued on next page.)

*Primary Examiner*—Ling-Siu Choi
(74) *Attorney, Agent, or Firm*—Anthony F. Matheny; Andrews Kurth LLP (57) ABSTRACT

A composition including polyalphaolefins that function as drag reducing agents and a process for the preparation of polyalphaolefins that function as drag reducing agents are disclosed. The process includes contacting alpha olefin monomers with a catalyst system, which includes a catalyst and an activator (co-catalyst) in a reactant mixture. The catalyst is a transition metal catalyst, preferably titanium trichloride, and the co-catalyst may include an alkylaluminoxane, alone or in combination, with a dialkylaluminum halide or a halohydrocarbon. The polymerization of the alpha olefin monomers produces a non-crystalline, ultra-high molecular weight polyalphaolefin having an inherent viscosity of at least 10 dL/g. The addition of the alkylaluminoxane during the polymerization process provides for a non-crystalline, ultra-high molecular weight polyalphaolefin and a more uniform molecular weight distribution of the resulting polyalphaolefin, thereby creating a drag reducing agent superior to known drag reducing agents. A process for forming a drag reducing agent comprising a non-crystalline, ultra-high molecular weight polyalphaolefin having an inherent viscosity of about at least 10 dL/g and a process for reducing drag in a conduit are also disclosed.

13 Claims, 4 Drawing Sheets

U.S. PATENT DOCUMENTS

| | | |
|---|---|---|
| 4,522,982 A | 6/1985 | Ewen |
| 4,539,374 A | 9/1985 | Fenton et al. |
| 4,584,244 A | 4/1986 | Fenton |
| 4,642,410 A | 2/1987 | Loveless |
| 4,656,204 A | 4/1987 | Duvdevani et al. |
| 4,659,685 A | 4/1987 | Coleman, III et al. |
| H316 H | 8/1987 | Kowalik et al. |
| 4,693,321 A | 9/1987 | Royer |
| 4,713,444 A | 12/1987 | Matsuyama et al. |
| 4,720,397 A | 1/1988 | O'Mara et al. |
| 4,724,255 A | 2/1988 | Lofgren et al. |
| 4,756,326 A | 7/1988 | Johnston |
| 4,758,354 A | 7/1988 | O'Mara et al. |
| 4,771,799 A | 9/1988 | Baxter et al. |
| 4,771,800 A | 9/1988 | Pomeroy |
| 4,789,383 A | 12/1988 | O'Mara et al. |
| 4,797,461 A | 1/1989 | Aubanel et al. |
| 4,826,728 A | 5/1989 | O'Mara et al. |
| 4,837,249 A | 6/1989 | O'Mara et al. |
| 4,845,178 A | 7/1989 | Hostetler et al. |
| 4,881,566 A | 11/1989 | Ubels et al. |
| 4,900,461 A | 2/1990 | Ver Strate et al. |
| 4,940,682 A | 7/1990 | Sasaki et al. |
| 4,945,142 A | 7/1990 | Gessell et al. |
| 4,952,738 A | 8/1990 | Gessell et al. |
| 4,959,436 A | 9/1990 | Cozewith et al. |
| 5,070,160 A | 12/1991 | Tomotsu et al. |
| 5,080,121 A | 1/1992 | Malik et al. |
| 5,081,087 A | 1/1992 | Villena et al. |
| 5,104,839 A | 4/1992 | McDaniel et al. |
| 5,122,584 A * | 6/1992 | Takahashi .................. 526/125 |
| 5,151,399 A | 9/1992 | Job |
| 5,162,277 A | 11/1992 | Job |
| 5,165,441 A | 11/1992 | Mitchell |
| 5,238,892 A | 8/1993 | Chang |
| 5,241,025 A | 8/1993 | Hlatky et al. |
| 5,243,001 A | 9/1993 | Winter et al. |
| 5,244,937 A | 9/1993 | Lee et al. |
| 5,276,116 A | 1/1994 | Gessell et al. |
| 5,276,220 A | 1/1994 | Samsel et al. |
| 5,278,264 A | 1/1994 | Spaleck et al. |
| 5,298,474 A | 3/1994 | Luciani et al. |
| 5,298,579 A | 3/1994 | Hoff et al. |
| 5,304,614 A | 4/1994 | Winter et al. |
| 5,310,716 A | 5/1994 | Luciani et al. |
| 5,320,994 A | 6/1994 | Bujadoux et al. |
| 5,326,835 A | 7/1994 | Ahvenainen et al. |
| 5,328,969 A | 7/1994 | Winter et al. |
| 5,348,925 A | 9/1994 | Milani et al. |
| 5,349,032 A | 9/1994 | Miyake et al. |
| 5,350,817 A | 9/1994 | Winter et al. |
| 5,356,848 A | 10/1994 | Brusson et al. |
| 5,359,015 A | 10/1994 | Jejelowo |
| 5,364,994 A | 11/1994 | Scharf |
| 5,373,072 A | 12/1994 | Chang |
| 5,374,752 A | 12/1994 | Winter et al. |
| 5,376,697 A | 12/1994 | Johnston et al. |
| 5,384,298 A | 1/1995 | Inahara et al. |
| 5,395,810 A | 3/1995 | Shamshoum et al. |
| 5,416,178 A | 5/1995 | Winter et al. |
| 5,416,179 A | 5/1995 | Welch et al. |
| 5,434,115 A | 7/1995 | Yamoda et al. |
| 5,436,212 A | 7/1995 | Geerts |
| 5,442,019 A | 8/1995 | Agapiou et al. |
| 5,449,732 A | 9/1995 | Smith et al. |
| 5,480,948 A | 1/1996 | Geerts |
| 5,504,131 A | 4/1996 | Smith et al. |
| 5,504,132 A | 4/1996 | Smith et al. |
| 5,521,242 A | 5/1996 | Supcoe et al. |
| 5,539,044 A | 7/1996 | Dindi et al. |
| 5,541,270 A | 7/1996 | Chinh et al. |
| 5,574,116 A | 11/1996 | Bujadoux et al. |
| 5,585,447 A | 12/1996 | Adisson et al. |
| 5,604,171 A | 2/1997 | Collette et al. |
| 5,639,842 A | 6/1997 | Tsutsui et al. |
| 5,644,007 A | 7/1997 | Davidson et al. |
| 5,668,228 A | 9/1997 | Chinh et al. |
| 5,705,577 A | 1/1998 | Rossi et al. |
| 5,710,224 A | 1/1998 | Alt et al. |
| 5,712,365 A | 1/1998 | Arai et al. |
| 5,728,855 A | 3/1998 | Smith et al. |
| 5,733,953 A | 3/1998 | Fairchild et al. |
| 5,858,904 A | 1/1999 | Takeuchi et al. |
| 5,869,570 A | 2/1999 | Eaton et al. |
| 5,932,670 A | 8/1999 | Koppl et al. |
| 6,015,779 A | 1/2000 | Eaton et al. |
| 6,126,872 A | 10/2000 | Kommareddi et al. |
| 6,160,036 A | 12/2000 | Kommareddi et al. |
| 6,162,773 A | 12/2000 | Eaton et al. |
| 6,172,151 B1 | 1/2001 | Johnston et al. |
| 6,178,980 B1 | 1/2001 | Storm |
| 6,242,395 B1 | 6/2001 | Eaton et al. |

FOREIGN PATENT DOCUMENTS

| | | |
|---|---|---|
| EP | 0101856 A | 5/1984 |
| EP | 0196350 A1 | 8/1986 |
| EP | 0196350 B | 11/1989 |
| EP | 0535230 A | 4/1993 |
| EP | 19612226 A | 10/1996 |
| EP | 0292797 A | 11/1998 |
| GB | 2074175 A | 10/1981 |
| GB | 2093466 | 9/1982 |
| JP | 2-124904 | 5/1990 |
| WO | WO 95/00563 | 1/1995 |

OTHER PUBLICATIONS

Miscellaneous Patent Summary, pp. 1–118.

Miscellaneous Patent Search, pp. 1–77.

Miscellaneous Patent Search, pp. 1–204.

John Boor, Jr., Ziegler–Natta Catalysts and Polymerizations, 1979, Chapter 18: Kinetics, pp. 464–511, Academic Press, New York, USA.

Tad W. Taylor, et al., Physiochemical Kinetics of Liquid Phase Propylene Polymerization, pp. 191–223, Eleventh Midland Macromolecular Meeting, Aug. 17–21, 1981, MMI Press, Midland, Michigan, USA.

B.M. Grieveson, Kinetics of the Polymerization of Ethhylene with a Ziegler–Natta Catalyst, 1965, Die Makromolecular Chemie, vol. 884, pp. 93–107.

Lutz Wohlfarth, Alternating Copolymerization of Butadiene and Propene with the VO90Neo)2Cl/A(iso–Bu)3 System 2: Influence of Electron Donors at a Polymerization Temperature of –45 C, 1991, Paste and Kautschuk, vol. 38, No. 9, pp. 297–299 (translation pp. 1–7).

* cited by examiner

METHODS FOR FORMING AMORPHOUS ULTRA-HIGH MOLECULAR WEIGHT POLYOLEFINS AND DRAG REDUCING COMPOSITIONS COMPRISING AMORPHOUS ULTRA-HIGH MOLECULAR WEIGHT POLYOLEFINS

CROSS REFERENCES TO RELATED APPLICATIONS

This application is a continuation application of U. S. application Ser. No. 09/081,964, filed May 20, 1998, now U.S. Pat. No. 6,015,779, which is a continuation-in-part of U.S. application Ser. No. 08/6 19,840, filed Mar. 19, 1996, now U.S. Pat. No. 5,869,570.

BACKGROUND OF THE INVENTION

1. Field of the Invention

This invention relates to methods for improving flow of hydrocarbons through conduits, particularly pipelines. The invention also relates to methods for making improved drag reducing agents, and preferably, to methods for making ultra-high molecular weight amorphous polymers and copolymers of alpha olefins with improved drag reducing properties, having inherent viscosities in excess of about 10 dL/g.

2. Description of Related Art

Generally speaking, the flow of liquid in a conduit, such as a pipeline, results in frictional energy losses. As a result of this energy loss, the pressure of the liquid in the conduit decreases along the conduit in the direction of the flow. For a conduit of fixed diameter, this pressure drop increases with increasing flow rate. When the flow in the conduit is turbulent (Reynold's number greater than about 2100), certain high molecular weight polymers can be added to the liquid flowing through the conduit to reduce the frictional energy losses and alter the relationship between pressure drop and flow rate. These polymers are sometimes referred to as drag reducing agents ("DRAs"), and they interact with the turbulent flow processes and reduce frictional pressure losses such that the pressure drop for a given flow rate is less, or the flow rate for a given pressure drop is greater. Because DRAs reduce frictional energy losses, increase in the flow capability of pipelines, hoses and other conduits in which liquids flow can be achieved. DRAs can also decrease the cost of pumping fluids, the cost of equipment used to pump fluids, and provide for the use of a smaller pipe diameter for a given flow capacity. Accordingly, an ongoing need exists to formulate improved drag reducing materials.

While various polymerization methods and reactants have been published in the patent literature, most of those methods do not yield specialized polymers with properties that make them effective as drag reducers. Many of the methods, for example, produce non-amorphous polymers. e.g., solid or crystalline polymers. Other methods yield polymers with molecular weights that are much too low to be useful in drag reduction. Still other methods yield polymers having poor drag reducing properties. For example, some commercially available polymers are deficient when used with highly viscous crude oil, where the need may be the greatest. In certain aspects, the present invention overcomes one or more of the above-mentioned shortcomings.

While alkylaluminoxane has been used in certain polymerization processes, the inventors are not aware of any patents or publications showing alkylaluminoxane being used to make drag reducing agents (DRAs) in general, or, more specifically, to make amorphous, ultra-high molecular weight polyalphaolefin polymers with the superior drag reducing properties of the present invention. For example, U.S. Pat. Nos. 5,436,212; 5,298,579; 5,070,160 and 4,659, 685 disclose certain uses of alkylaluminoxane, but do not disclose or suggest the present invention.

SUMMARY OF INVENTION

The present invention is directed to methods of improving the flow of hydrocarbons through conduits, particularly viscous crude oil flowing through pipelines. Surprisingly, it has been discovered that a drag reducing agent (DRA) made in accordance with the methods of this invention can produce as much as about thirty percent (30%) or greater flow improvement when added to a hydrocarbon flowing through a conduit. Advantageously, such flow improvement can result when the drag reducing agent's polymer is added to the hydrocarbon at a concentration of as low as 1 part per million (ppm) by weight.

In certain aspects, the invention also relates to methods of producing amorphous, ultra-high molecular weight drag reduction agents having unexpectedly superior drag reduction properties when combined with liquid hydrocarbons, such as viscous crude oil. In another aspect, the invention is directed to a composition of matter, including an amorphous drag reduction agent with an ultra-high average molecular weight, far in excess of ten million, with inherent viscosities in excess of about 10 dL/g.

Broadly, one aspect of the invention involves a method of producing an amorphous polyalphaolefin mixture containing an ultra-high molecular weight polyalphaolefin polymer with an inherent viscosity of at least about 10 dL/g and surprisingly superior drag reducing properties when combined with crude oil that is flowing through a pipeline or other conduit. The method preferably includes the steps of contacting a reactant mixture that includes alpha olefin monomers with a transition metal catalyst and an alkylaluminoxane co-catalyst, to provide an amorphous polyalpha-olefin mixture containing an ultra-high molecular weight polyalphaolefin polymer with an inherent viscosity of at least about 10 dL/g and surprisingly superior drag reducing properties when used with viscous crude oil. The polyalphaolefin mixture can be introduced to a pipeline or other conduit having flowing hydrocarbons, such as viscous crude oil. The polyalphaolefin DRA mixture should be introduced in an amount sufficient to increase the flow of the flowing hydrocarbons, preferably at a concentration of from about 1 to 250 ppm by weight, and more preferably from about 25 to 150 ppm by weight.

A specific embodiment of the invention is directed to a method for forming a drag reducing agent comprising a non-crystalline, ultra-high molecular weight polyalphaolefin having an inherent viscosity of at least about 10 deciliters per gram, by contacting alpha olefin monomers with a catalyst system that includes a transition metal catalyst and a co-catalyst mixture that includes an alkylaluminoxane co-catalyst; and polymerizing the alpha olefin monomers at a temperature at about or less than about 25° C.; wherein, during the polymerization, at least a portion of the alpha olefin monomers polymerize in the reactant mixture to provide an ultra-high molecular weight polyalphaolefin.

In another specific embodiment of the invention, the polymerization is terminated by adding a "deactivator" to the reactant mixture after at least a portion of the alpha olefin monomers polymerize in the reactant mixture, to provide an amorphous, ultra-high weight polyalphaolefin. One example of a deactivator is a mixture of isopropyl alcohol and butylated hydroxytoluene.

A variety of alpha olefin monomers are useful in this invention, including homopolymers, copolymers and terpolymers, which can be present in the reactant mixture in different amounts, alone or in combination. Preferably, these monomers are present at a charge rate of about 4% to 22% based on total weight of the reactant mixture. Charge rate is herein defined as the weight percent of total charge including solvent, co-catalyst, catalyst, and alpha olefin monomers. More preferably, these monomers are present at a charge rate of 8% to 20% based on total weight of the reactant mixture. Examples of alpha olefin monomers that are useful in this invention are co-monomers of 1-hexene and 1-dodecene alpha olefins; or co-monomers of 1-octene and 1-tetradecene alpha olefins in a 1:1 ratio based upon mole weight of the monomers.

A preferred transition metal catalyst is titanium trichloride, which is preferably present in the reactant mixture in an amount of from about 100 to about 1500 parts per million, preferably from about 150 to about 400 parts per million, based on the total weight of all the reactants or components in the reactant mixture.

A further feature of the process for forming a drag reducing agent comprising a non-crystalline, ultra-high molecular weight polyalphaolefin having an inherent viscosity of at least about 10 deciliters per gram is that the reactant mixture may include at least one hydrocarbon solvent such that the alpha olefin monomers and polyalphaolefin remain substantially dissolved in the hydrocarbon solvent. An additional feature of the process is that the polymerization of the alpha olefin monomers continues such that the polyalphaolefin is present in the reactant mixture at a concentration of at least about 4 weight percent based upon the weight of the reactant mixture and the polyalphaolefin having an inherent viscosity of at least about 10 deciliters per gram is formed in less than about 12 hours. Another feature of the process is that the polyalphaolefin has an inherent viscosity of at least about 10 deciliters per gram and is amorphous with substantially no crystalline particles. A further feature of the process is that the flow increase is at least about 30% when the polyalphaolefin is present in hexane at a weight concentration of 1 part per million. Another feature of the process is that the catalyst system may include dibutylaluminum chloride and/or diethylaluminum chloride.

In another specific embodiment, the present invention includes a drag reducing agent comprising a non-crystalline, ultra-high molecular weight polyalphaolefin having an inherent viscosity of at least 10 deciliters per gram, formed by contacting alpha olefin monomers with a catalyst system in a reactant mixture, wherein the catalyst system includes a transition metal catalyst, such as titanium trichloride, and the co-catalyst mixture includes an alkylaluminoxane co-catalyst, such as methylaluminoxane and isobutylaluminoxane; and polymerizing the alpha olefin monomers at a temperature at about or less than 25° C., preferably less than 10° C., wherein during the polymerization, at least a portion of the alpha olefin monomers polymerize in the reactant mixture to provide a non-crystalline, ultra-high molecular weight polyalphaolefin.

In yet another specific embodiment, the present invention includes a process for reducing drag in a conduit by forming a drag reducing agent comprising a non-crystalline, ultra-high molecular weight polyalphaolefin, by contacting alpha olefin monomers with a catalyst system in a reactant mixture, wherein the catalyst system includes a transition metal catalyst and an alkylaluminoxane co-catalyst; polymerizing the alpha olefin monomers at a temperature at about or less than 25° C., preferably less than 10° C.; wherein during the polymerization, at least a portion of the alpha olefin monomers polymerize in the reactant mixture to provide a non-crystalline, ultra-high molecular weight polyalphaolefin having an inherent viscosity of at least 10 deciliters per gram; and introducing the drag reducing agent into the conduit.

In still another aspect of the invention, a halohydrocarbon co-catalyst may be used in conjunction with a transition metal catalyst to form the drag reducing agent. For example, another specific embodiment of the invention is directed to a process for forming a drag reducing agent comprising a non-crystalline, ultra-high molecular weight polyalphaolefin having an inherent viscosity of at least about 10 deciliters per gram. The process includes the steps of contacting alpha olefin monomers with a catalyst system in a reactant mixture, wherein the catalyst system includes a transition metal catalyst and a co-catalyst mixture having at least two co-catalysts, wherein one of the co-catalysts preferably is a halohydrocarbon. More preferably, the co-catalyst mixture also includes alkylaluminoxane. The alpha olefin monomers are polymerized at a temperature at about or less than 25° C., wherein during the polymerization, at least a portion of the alpha olefin monomers polymerize in the reactant mixture to provide a non-crystalline, ultra-high molecular weight polyalphaolefin.

A further feature of the process for forming a drag reducing agent comprising a non-crystalline, ultra-high molecular weight polyalphaolefin having an inherent viscosity of at least about 10 deciliters per gram is that the halohydrocarbon is preferably a chloride containing halohydrocarbon such as ethylene dichloride. Another feature of the process is that the transition metal catalyst is preferably titanium trichloride. An additional feature of the process is that the catalyst system preferably includes an alkylaluminoxane such as methylaluminoxane and/or isobutylaluminoxane.

DETAILED DESCRIPTION OF THE INVENTION

The following detailed description refers to certain details and specific aspects of the invention, including specific embodiments and examples of the invention. Also, for purposes of better understanding the invention, certain terms will now be explained and defined. It is to be understood that the invention is not limited or restricted to the specific examples and embodiments described below, which are included to assist a person skilled in the art in practicing the invention. Rather, the scope of the invention is determined based on the claims below, including any equivalents thereof.

Drag Reducing Agents. The term "drag reducing agent" (DRA) as used herein refers to a composition that includes at least the formed polyalphaolefin polymer, preferably made in accordance with the methods described herein. Preferably, because the polyalphaolefin polymer of this invention is typically fully dissolved in the solvent, the "DRA" can also refer to the entire reactant mixture after sufficient polymerization has occurred (also referred to as a "polymerization mixture"), including not only the polyalphaolefin, but also the solvent, any viscosity reducing agents and any unreacted monomers. The DRA can also include an) remaining transition metal catalyst and cocatalyst. The term "polyalphaolefin" refers to the polymer material formed by the polymerization of the alpha olefin monomers, and is broadly construed to include not only the polymer in its final form, e.g., polyalphaolefin having an ultra-high molecular weight and inherent viscosity of 10 dL/g or greater, but also any intermediate polymers being formed, sometimes referred to as "oligomers."

Flow Increase. A preferred aspect of the present invention is directed to "flow increase" or "drag reduction." As discussed below, drag reducing agents reduce drag and increase the flow rate of hydrocarbons passing through conduits, particularly crude oil or refined hydrocarbons passing through pipelines. In at least one aspect, the DRA can be introduced into the conduit to improve flow conditions by reducing frictional pressure losses, or frictionally generated energy bursts, associated with movement of fluid within the conduit. These frictionally generated energy bursts typically emanate from throughout the turbulent core of the flowing hydrocarbons and include lateral turbulent microbursts generated from or near the conduit walls. More simply stated, the DRAs tend to reduce the impact of turbulence through direct interaction and absorption of some or most of these energy bursts thus improving flow characteristics in the conduit. It has been discovered that a DRA should have the right combination of properties to provide superior drag reduction and flow improvement. For example, the DRA should be non-crystalline and amorphous, preferably having substantially no solid particles. The DRA also should have an ultra-high molecular weight, as discussed above. Finally, the DRA needs to provide superior flow improvement. In this respect, it has been observed by the inventors that the mere fact that a polymer is amorphous and has a very high molecular weight does not necessarily make it useful for flow improvement. The superior properties of the DRA of this invention are thus both surprising and unexpected.

Accordingly, one of the more important aspects of the invention is the superior "flow increase" or "drag reduction" provided by the DRA That is, when combined in sufficient quantities with a hydrocarbon flowing through a conduit, the DRA of this invention provides a flow increase that is superior to the flow increases provided by other commercially available DRAs. Although flow increase can be defined in qualitative terms, it can also be quantified, for comparison purposes, by using an empirical test sometimes called a "Percent Flow Increase" test, calculated using the following equation:

$$\text{Percent Flow Increase} = \frac{W_1 - W_0}{W_0} \times 100\%$$

As discussed below in the Examples, Percent Flow Increase measurements were taken of certain samples of invention DRA and also of certain comparative DRA samples. Both 1" and ¼" diameter hydraulic flow loops were used herein to measure Percent Flow Increase. The value "$W_0$" refers to the weight of a test sample of hydrocarbon without any DRA present, while the term "$W_1$" refers to the weight of a test sample of hydrocarbon with a predetermined amount of DRA present. In either case, the weight of the test sample is determined by carefully weighing the amount of hydrocarbon that passes through the flow loop over a constant time interval. The time interval is dependant upon the total weight of DRA treated hydrocarbon which is passed through the flow loop. In the 1" flow loop, thus weight is typically greater than 150 pounds of DRA treated hydrocarbon. In the ¼" flow, loop, this weight is typically about 1 pound of DRA treated hydrocarbon.

Similarly, another quantitative method of measuring drag reduction, and particularly for comparing different DRAs, is measuring "Percent Drag Reduction" (% DR) which is calculated using the following equation:

$$\text{Percent Drag Reduction} = \frac{P_1 - P_0}{P_0} \times 100\%$$

The term "$P_0$" refers to the measured pressure drop occurring when pure hexane (without DRA) is pumped through a flow loop. The term "$P_1$" refers to the measured pressure drop occurring when hexane (treated with DRA) is pumped through the flow loop. Percent Drag Reduction (% DR) is also discussed in the Examples.

Ultra-High Molecular Weight. Another important aspect of this invention is that the polyalphaolefin polymer must have an "ultra-high molecular weight," a term defined herein as a molecular weight corresponding to an inherent viscosity of at least about 10 dL/g. Because of the extremely high molecular weight of the DRA polymer, it is difficult to reliably and accurately measure the actual molecular weight, but inherent viscosity provides a useful approximation of molecular weight. For purposes of the present invention, "inherent viscosity" is measured using a Cannon-Ubbelohde four bulb shear dilution viscometer (0.1 g polymer/100 ml toluene at 25° C.). Inherent viscosities are calculated for each of the four bulbs. The viscosities are then plotted as a function of shear rate. The plot is then used to determine the inherent viscosity at a shear rate of 300 sec-1. It is contemplated that an inherent viscosity of 10 dL/g corresponds roughly to a molecular weight of at least about 10 or 15 million. Preferably, the ultra-high molecular weight polyalphaolefins of the present invention have molecular weights even higher, e.g., greater than 25 million. The polyalphaolefins formed should also have a narrow molecular weight distribution. Because different assumptions about the properties of the polyalphaolefin can yield different estimates of molecular weights, the inventors prefer using inherent viscosity to characterize the molecular weights of their drag reducing agents.

Amorphous. Yet another property of the polyalphaolefin made in accordance with the invention is its substantially non-crystalline nature. Preferably, the polyalphaolefin is liquid and is soluble in the hydrocarbon solvent used as discussed herein, so that a single liquid phase reactant mixture is provided. Preferably, the polyalphaolefin is amorphous, having no crystalline structures, or habits, existing in a single phase with substantially no solid particles. Preferably, during the polymerization process, the polyalphaolefin being formed fully dissolves into the solvent, providing a single-phase DRA that can be used without the need to conduct any separation procedures. Furthermore, another advantage of the single-phase DRA of this invention is that it can be conveniently tested for quality purposes. Moreover, this DRA has a long stable shelf life.

Catalyst System. An important aspect of the invention is the "catalyst system," which, as defined herein, includes a transition metal catalyst and a co-catalyst mixture, preferably containing an alkylaluminoxane co-catalyst. The transition metal catalyst and the alkylaluminoxane co-catalyst can be combined with the alpha olefin monomer in a number of ways. The transition metal catalyst and alkylaluminoxane co-catalyst are preferably combined with the monomer at the same time. They are preferably mixed together before the polymerization reaction is initiated. Preferred transition metal catalysts include catalysts containing titanium trichloride, titanium tetrachloride or metallocene or combinations thereof. Preferably, the transition metal catalysts are non-metallocene. Titanium trichloride, which is most preferred, has been used for years in making drag reducing agents, and is preferably used in an amount ranging from at least about 100 to 1500 parts per million (ppm) based on the weight of all the components, i.e., the alpha olefins, solvents, co-catalysts, and catalysts supplied to the reactor. The co-catalyst mixture may include alkylaluminoxane alone, or may also include at least one other component, such as diethylaluminum chloride ("DEAC") or dibutylaluminum chloride ("DIBAC"). In a highly preferred aspect of the invention, other co-catalysts that provide excellent results are halohydrocarbons, such as ethylene dichloride used either alone, or in combination with an alkylaluminoxane co-catalyst.

Alkylaluminoxane. Surprisingly, it has been discovered that a component that provides the polyalphaolefin of this invention with its superior flow improving properties when combined with hydrocarbons (e.g., crude oil) is alkylaluminoxane, preferably either methylaluminoxane (MAO) or isobutylaluminoxane (IBAO). Thus, alkylaluminoxane is a particularly critical ingredient for carrying out the method of the invention. Alkylaluminoxane is a compound having a plurality of aluminum atoms, typically formed by a condensation reaction in which a trialkylaluminum compound (e.g., trimethylaluminum) is combined with a condensing agent, such as water (i.e., resulting in hydrolysis). It is noted, however, that the present invention is not concerned with how to actually make the alkylaluminoxane, which is commercially available from a variety of sources, for example, AKZO NOBEL Chemical Inc., Chicago, Ill.

In addition to MAO and IBAO, it is contemplated that other alkylaluminoxanes can also be used, including chain alkylaluminoxanes and cyclic aluminoxanes. A chain aluminoxane has the following general structure, wherein $R^1$ is an alkyl group and n is the polymerization degree:

A cyclic alkylaluminoxane is a long-chained compound having a chemical structure formed by repeating units having the following structure, wherein $R^1$ is an alkyl group:

In the method of the invention, the concentration of the alkylaluminoxane in the co-catalyst mixture is preferably in the range of at least about 100 to about 3500 parts per million (ppm), based on the weight of all the components in the reactant mixture. More preferably, the concentration of the alkylaluminoxane in the catalyst mixture is from at least about 800 to about 2000 ppm.

Halohydrocarbon. Another surprising discover relates to the use of one or more halohydrocarbons as co-catalysts. "Halohydrocarbons" are herein defined as compounds having the formula $R-X_n$, wherein X is a halogen, n is the number of halogen atoms, and R is a hydrocarbon group such as aromatic and aliphatic hydrocarbons, including alkanes, alkenes, acetylenes, or any other hydrocarbon known to persons skilled in the art which may be combined with one or more halogens in accordance with the formula $R-X_n$. In a specific embodiment, the X is chloride, n is 2, and R is an alkane. More preferably, the halohydrocarbon is ethylene dichloride.

Specifically, it has also been discovered that using a halohydrocarbon as a co-catalyst, particularly in combination with an alkylaluminoxane co-catalyst, provides polyalphaolefins with superior flow improving properties when compared to other drag reducing agents. Chloride containing halohydrocarbons are preferred. Although only theoretical at this point, it is contemplated that the chloride containing halohydrocarbons act as chloride donors which promote polymerization of alpha olefins.

The halohydrocarbon is preferably combined with an alkylaluminoxane and titanium trichloride catalyst to form a catalyst system, e.g., a slurry. It is contemplated that, in a specific embodiment, dibutylaluminum chloride and/or diethylaluminum chloride may also be included in the catalyst slurry. The catalyst system is then mixed with the alpha olefin monomers. It has been discovered that polymerization of the alpha olefin monomers in the presence of the halohydrocarbon forms a polyalphaolefin which has improved drag reducing capabilities.

Perhaps the most surprising result arising from the use of a co-catalyst mixture utilizing both ethylene dichloride and alkylaluminoxane is its impact on polymerization rates. For example, typical Ziegler-Natta polymerization processes require approximately 15 to 70 hours of polymerization time to form a weight percent polyalphaolefin having drag reducing characteristics. By comparison, using ethylene dichloride as a co-catalyst, the rate of polymerization is increased dramatically such that the weight percent of the polyalphaolefin in the reactant mixture may be formed in less time. For example, a reactant mixture having a selected weight percent polyalphaolefin as a reference may be formed in under 12 hours. Preferably, a 5 weight percent polyalphaolefin may be formed in under 7 hours, and more preferably, in under 5 hours. Such a rapid rate of polymerization is a dramatic improvement over the current procedures for forming drag reducing agents.

In a specific embodiment of the invention, a drag reducing agent comprising a non-crystalline, ultra-high molecular weight polyalphaolefin having an inherent viscosity of at least about 10 deciliters per gram is formed by contacting alpha-olefin monomers with a catalyst system in a reactant mixture. The catalyst system includes a transition metal catalyst, such as titanium trichloride, and a co-catalyst mixture having at least two co-catalysts, wherein one of the co-catalysts is a halohydrocarbon. While it is contemplated that any halohydrocarbon co-catalyst may be utilized, preferably, the halohydrocarbon co-catalyst is either an alkyl halide or an alkyl dihalide, and more preferably is an alkyl dihalide. Preferably the halogen atom of the halohydrocarbon is chloride, and the most preferred halohydrocarbon is ethylene dichloride. An alkylaluminoxane co-catalyst such as methylaluminoxane and/or isobutylaluminoxane is preferably included in the catalyst system.

The alpha olefin monomers should be polymerized at a temperature at about or less than 25° C., and preferably, at about or less than 10° C., wherein during the polymerization, at least a portion of the alpha olefin monomers polymerize in the reactant mixture to provide a non-crystalline, ultra-high molecular weight polyalphaolefin. Preferably, the alpha olefin monomers are polymerized at a temperature of about −5° C. The ethylene dichloride co-catalyst should be present in the reactant mixture at a concentration ranging from at least about 50 weight ppm based upon the weight of all the reactants in the reactant mixture to about 200 weight ppm. Preferably, the ethylene dichloride is present in the reactant mixture at a concentration ranging from at least about 80 weight ppm to about 120 weight ppm.

Reactant Mixture. Generally, the reactant mixture includes alpha olefin monomers and solvent, which is then combined with the "catalyst system," discussed above. Useful alpha olefin monomers broadly include any that are capable of forming a polyalphaolefin with the desired properties discussed herein. Preferably, the alpha olefin monomers have 2 to 20 carbon atoms. Homopolymers, copolymers and terpolymers maybe used. Preferred alpha olefins include ethylene, propylene, 1-butene, 4-methyl-1-pentene, 1-hexene, 1-octene, 1-decene, 1-dodecene and 1-tetradecene; conjugated or unconjugated dienes such as butadiene and 1,4-hexadiene; aromatic vinyls such as styrene; and cyclic olefins such as cyclobutene. Most preferably, the alpha olefin monomers are co-monomers of 1-hexene and 1-dodecene present in a 1:1 mole ratio; or co-monomers of 1-octene and 1-tetradecene present in a 1:1 mole ratio. The alpha olefin monomers can be present in the reactant mixture at a charge rate of 4% to 22% based upon the total weight of the reactant mixture, or more preferably, at a charge rate of 8% to 20%.

Polymerization. Liquid phase polymerization is the preferred technique for forming the DRA polyalphaolefins of this invention, as discussed below in greater detail. In liquid phase polymerization, the monomers and polymers are both completely dissolved in the solvent. It is critical that substantially no solid phase particles are formed. It is contemplated, however, that a variety of other polymerization reactions can form the DRA polyalphaolefins of this invention, including, for example, gas phase polymerization, bulk polymerization, suspension polymerization and emulsion polymerization. These polymerization procedures are relatively conventional, and are generally either known by persons skilled in the art; readily ascertainable from the patent and technical literature; or can be arrived at without excessive experimentation. Additionally, either batch or continuous polymerization methods can be used, in either one or multiple stages. Furthermore, the various reactants may be added to the reactant mixture in numerous ways, all which are known to persons skilled in the art. For example, the catalyst, alpha olefin monomers, and hydrocarbon solvent may be combined together in a storage tank and stored until the polymerization process is initiated by the addition of the co-catalyst mixture. Alternatively, the catalyst and the alpha olefins may be combined in advance of adding the hydrocarbon solvent and the co-catalyst from separate sources. Preferably, as discussed below, the catalyst system including transition metal catalyst and one or more co-catalysts is formed first and then combined with the alpha olefin monomers and the hydrocarbon solvent from separate sources.

Batch liquid phase polymerization is part of a presently preferred method of forming the DRAs of this invention. Because relatively low temperatures are involved, insulated reaction vessels are used. The temperature of the reactant mixture is preferably maintained at about 25° C. or less, preferably, at about 10° C. or less. The pressure of the reaction mixture is not critical, and is usually in the range of from about atmospheric pressure to about 1500 psig. The polymerization is conducted under conditions such that the polyalphaolefin being formed will have an inherent viscosity, of about at least 10 deciliters per gram (dL/g). The time for the polyalphaolefin to reach that inherent viscosity depends largely on the catalyst system, reaction conditions and the concentration of monomers being polymerized.

A catalyst system can be prepared by first mixing the appropriate amount of transition metal catalyst (e.g., titanium trichloride) with the respective liquid co-catalysts. This catalyst system is then directed to a storage vessel where the catalyst system may be stored, or aged or conditioned, for a time sufficient to optimize the efficaciousness of the catalyst system. Preferably, the catalyst system is stored for at least about 6 to about 72 hours. More preferably, the catalyst system is stored for at least about 10 to about 30 hours. To begin the polymerization reaction, the catalyst system can be metered from this storage vessel into the first reactor where it is mixed in desired proportions with the alpha olefin monomers.

In a batch process, polymerization can be initiated in a first reactor at an appropriate temperature and pressure. After polymerization progresses for a predetermined period of time, e.g., long enough to form a certain amount of polyalphaolefin polymer with a certain molecular weight and molecular weight distribution as determined by, e.g., inherent viscosity, the polyalphaolefin mixture can be transferred to a second reactor, where polymerization continues, until the polyalphaolefin mixture has the desired final inherent viscosity via monomer to polymer conversion. After this transfer takes place, fresh starting ingredients can be added to the first reactor, including new amounts of catalyst system containing alkylaluminoxane co-catalyst and unreacted alpha olefins.

Alternatively, two reactors can be used in a continuous process. During start-up, the starting ingredients, i.e., the alpha olefin monomer reactants, a transition metal catalyst, co-catalyst mixture are added to the first reactor. After a period of time, the monomers in the first reactor form a predetermined minimum amount of oligomers and fully-formed polyalphaolefin polymers. A portion of the oligomers and polymers are then continuously pumped into the second reactor, at a predetermined rate and mixed with a hydrocarbon solvent. The hydrocarbon solvent enhances the ability of the DRA to become incorporated or dissolved into the hydrocarbons, e.g., the crude oil in a pipeline. While it is contemplated that any hydrocarbon solvent may be employed which enhances the DRA's incorporation into the hydrocarbon, suitable hydrocarbon solvents include aromatic and aliphatic hydrocarbons, butanes, propanes, isopentanes, and other mixed liquid propane gas and natural gas liquids. Preferably, all acceptable solvents must not contain more than trace amounts (i.e., less than about 5 ppm) of sulfur or sulfur containing compounds.

Simultaneously, new starting ingredients are pumped into the first reactor, eventually reaching a steady state balance between the incoming ingredients and the outgoing oligomer/polymer mixture. Preferably, the flow of material into and out of the first reactor is controlled to maintain a relatively constant average molecular weight and narrow molecular weight distribution of the polyalphaolefin, e.g., as reflected by inherent viscosity. The resident time of the reactant mixture in the second reactor can be varied in accordance with the desired final molecular weight and molecular weight distribution of the polyalphaolefin. The average molecular weight of the polyalphaolefins in the reactant mixture in the second reactor tend to be far greater than that of the oligomer/polymer mixture in the first reactor. Additional reactors can also be used, depending on the design of the system.

As mentioned above, the polymerization of the alpha olefin monomers is conducted in the presence of a catalyst system, which includes a transition metal catalyst and a co-catalyst mixture. The catalyst and co-catalysts may be added as initial raw ingredients or they may be added as additives at any time during the polymerization process. Preferably, the catalyst and co-catalysts are added to the polymerization reaction mixture at the same time alpha olefin monomers are added. Alternatively, in a two-stage process, the catalyst and the co-catalyst mixture are added at any time during actual polymerization, i.e., in the absence of "catalyst killers" or any other polymerization-terminating ingredient.

Preferably, the process is carried out in the presence of excess monomers to provide a process which does not end due to the exhaustion of monomers. In a preferred embodiment, the process is halted by the addition of deactivators, or catalyst inhibitors, such as a mixture of isopropyl alcohol and butylated hydroxytoluene, after a sufficient amount of polyalphaolefin is produced by the polymerization reaction. The addition of the catalyst inhibitors terminates the polymerization reaction in advance of full monomer conversion and provides selective capture of polyalphaolefins having the desired properties including desired molecular weight and molecular weight distribution. Isopropyl alcohol may be added to the reactant mixture at a concentration of from about 0.1 weight percent to about 1 weight percent. Preferably, the isopropyl alcohol is added to the reactant mixture at a concentration of about 0.25 weight percent. Butylated hydroxytoluene may be added in small amounts to the isopropyl alcohol as a preservative and/or antioxidant. Butylated hydroxytoluene may be added to the reactant mixture as a component mixture in the isopropyl alcohol at a concentration of from about 0.1 weight percent to about 5.0 weight percent of the isopropyl alcohol. Preferably, the butylated hydroxytoluene is added to the reactant mixture at a concentration of about 1.0 weight percent of the isopropyl alcohol.

Preferably, the polymerization is carries out until the weight percent of the polyalphaolefin in the reactant mixture ranges from at least about 4 to about 12 weight percent polyalphaolefin. The weight percent of the polyalphaolefin in the reactant mixture more preferably ranges from at least about 5 to about 10 weight percent, and even more preferably ranges from at least about 7 to about 10 weight percent.

In another specific embodiment, the process is carried out in the absence of a hydrocarbon solvent until all available alpha olefin monomers have been exhausted, i.e., polymerized. Due to the absence of solvent, after the alpha olefin monomers have been polymerized, a polyalphaolefin block is formed. "Polyalphaolefin block" is herein defined as polyalphaolefin having a sufficiently high viscosity such that the polyalphaolefin is gel-like and may even retain its three-dimensional shape, e.g., a cylindrical block, at room temperature. The polyalphaolefin block is preferably a ductile or malleable mass which is resilient and tacky. The polyalphaolefins which form the polyalphaolefin block should be amorphous and substantially non-crystalline having an ultra-high molecular weight.

The polyalphaolefin block may then be used to reduce drag in a conduit by adding the polyalphaolefin block, or pieces of the polyalphaolefin block, to a conduit containing hydrocarbons. The polyalphaolefin block may also be further processed by any method known to those skilled in the art to be utilized to reduce drag in a conduit. For example, the polymer block may be frozen using liquid nitrogen and ground into smaller pieces which may then be directly combined with hydrocarbon in a conduit to reduce drag, or dissolved in an emulsifier or dispersant and then combined with hydrocarbon in a conduit to reduce drag.

Figure 1:
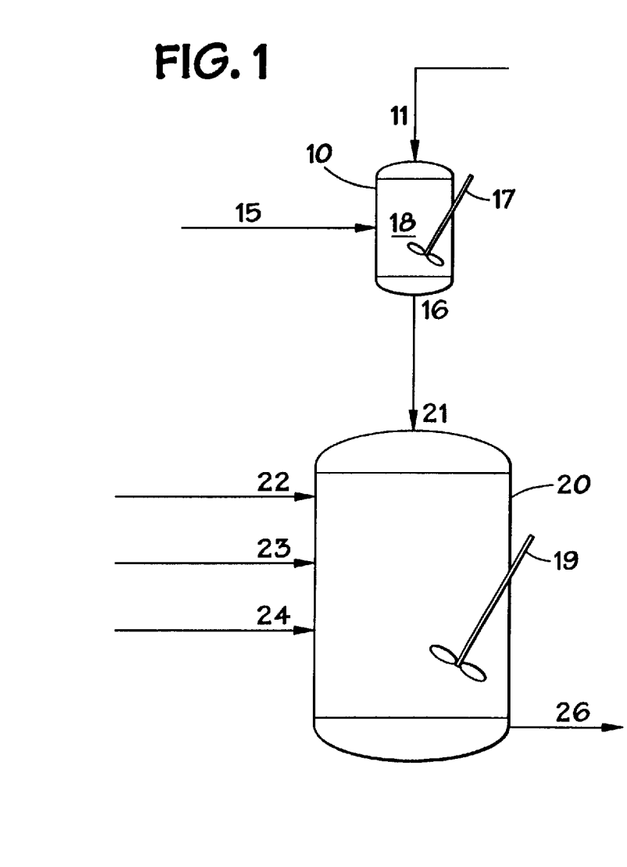
FIG. 1 is a flow diagram of a single-stage batch process.

The flow diagram of FIG. 1 illustrates a batch polymerization system used in one specific embodiment of the methods of the present invention. The system includes a catalyst preparation tank 10 and a batch reaction vessel 20. The catalyst preparation tank 10 includes a first inlet stream 11 that includes the transition metal catalyst and a second inlet stream 15 that includes a co-catalyst mixture. An appropriate mixing or agitation device 17 mixes the catalyst material with the co-catalyst mixture to form a catalyst system 18. An outlet 16 in communication with a first inlet 21 of the batch reaction vessel 20. Valves, pumps and other devices (not shown) can be used to control the flows of the various streams. The batch reaction vessel 20 has a second inlet for introduction of the alpha olefin monomer material in stream 22. The batch reaction vessel 20 also has a third inlet for the introduction of the hydrocarbon solvent in stream 23. In a specific embodiment of the invention, wherein a viscosity-reducing agent is utilized, a fourth inlet is included for introduction of a viscosity reducing agent that includes a substantially hydrophobic dispersant. Aromatic and/or aliphatic hydrocarbon solvent may be introduced together with the viscosity reducing agent through inlet 24 or, alternatively, may be introduced separately through inlet 23. Batch reaction vessel 20 can also include an appropriate mixing or agitation device 19. In one embodiment of the method, the catalyst system 18, prepared in the catalyst preparation tank 10, is introduced to the batch reaction vessel 20 through inlet 21 of the batch reaction vessel 20 and is mixed in desired proportions with the hydrocarbon solvent, viscosity reducing agent and alpha olefin material which are metered into the batch reaction vessel 20 through their respective inlets. Polymerization is initiated at appropriate temperatures and pressures. Alternatively, polymerization may be initiated at appropriate temperatures and pressures prior to the introduction of the viscosity reducing agent, the viscosity reducing agent thereafter being introduced during polymerization. Polymerization may be terminated naturally when all the monomer in the reactor is consumed, or, alternatively, by introducing a deactivator. The polyalphaolefin material formed by the process of polymerization may be withdrawn from the batch reaction tank 20 through inlet 26. Valves, pumps and other devices (not shown) may be interposed as necessary to remove the entire mixture, including formed polyalphaolefin, from the batch reaction polymerization vessel.

Figure 2:
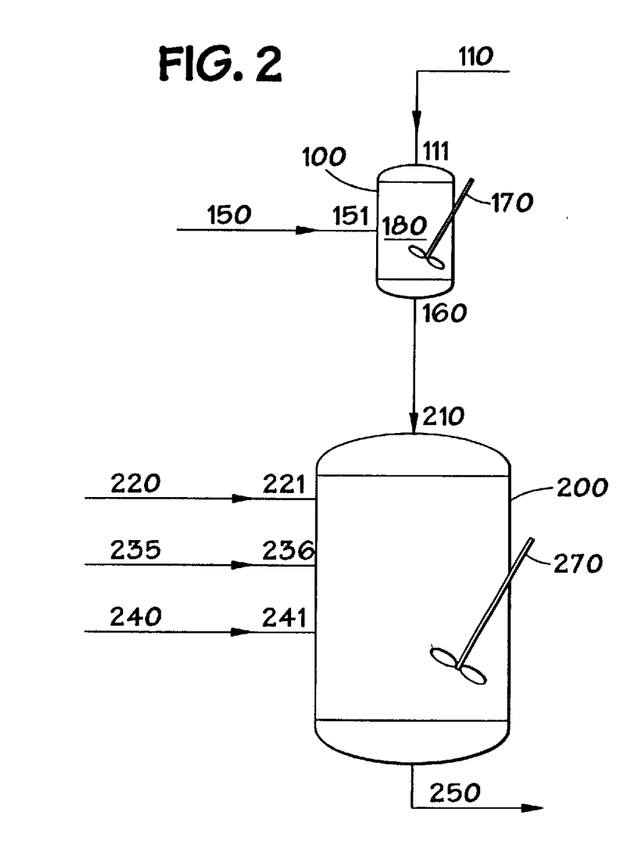
FIG. 2 is a flow diagram of a single-stage continuous process.

In accordance with another embodiment of this invention, shown in FIG. 2, a catalyst system 180 that includes a transition metal catalyst may be prepared in a catalyst preparation and storage vessel 100 by mixing the transition metal catalyst in stream 110, introduced through a first inlet 111, with co-catalyst mixture in stream 150 introduced through a second inlet 151 to form a catalyst system 180. The catalyst preparation and storage vessel may include a mixing or agitation device 170 as necessary. The catalyst preparation and storage vessel 100 has outlet 160 in communication with a first inlet 210 of a first reactor 200. The catalyst system 180 may be continuously metered from the catalyst preparation and storage vessel 100 through outlet 160 in communication with first inlet 210 into the first reactor 200 whereby the catalyst system 180 is mixed in desired proportions with alpha olefin monomers in stream 220 introduced through second inlet 221 and hydrocarbon solvent stream 235, introduced through a third inlet 236, which are continuously metered from other sources not shown. Polymerization is initiated in the first reactor 200 at appropriate temperatures and pressures. First reactor 200 includes an appropriate mixing or agitation device 270 and an outlet 250 for continuous removal of polyalphaolefin and the other materials in the reactor 200. A viscosity reducing agent in stream 240, which includes a substantially hydrophobic dispersant, may also be metered from a separate source into the first reactor 200 through a fourth inlet 241 prior to commencing the polymerization reaction. Additionally, or alternatively, the viscosity reducing agent may be metered into the first reactor 200 through the fourth inlet 241 during polymerization. Additional reactors may also be provided in which polymerization continues and from which non-crystalline, ultra-high molecular weight polyalphaolefin product may be recovered.

Figure 3:
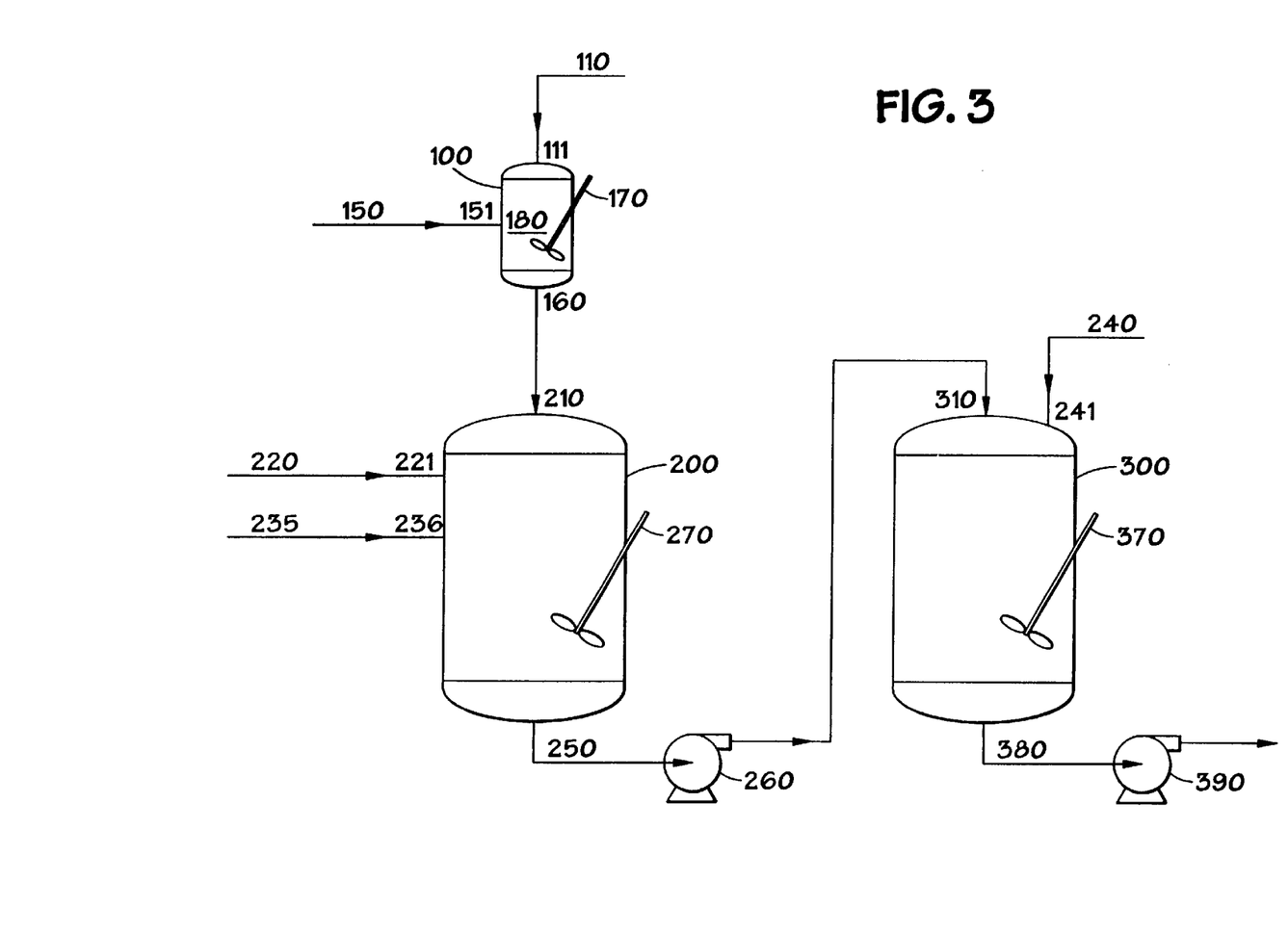
FIG. 3 is a flow diagram of a two-stage continuous process.

In another specific embodiment, referring to FIG. 3, a second reactor 300 is provided in which the materials of the first reactor 200 (also shown in FIG. 2), including catalyst system, unreacted alpha olefin, oligomers and polyalphaolefin, may be pumped continuously from outlet stream 250 of the first reactor by pump 260 into the second reactor 300 through inlet stream 310, where the molecular weight of the polyalphaolefin drag reducing agent polymer is further increased. Additionally, a viscosity reducing agent in stream 240 may also be metered into the second reactor 300 through fourth inlet 241. Second reactor 300 includes an appropriate mixing or agitation device 370 and outlet 380 for removal of the DRA product which includes polyalphaolefin and the other remaining materials in second reactor 300. Removal of the polyalphaolefin and other remaining materials in reactor 300 may be accomplished by pump 390. Valves, pumps and other devices (not shown) may be interposed as necessary. As another feature of this invention, fresh reactants may be added to the first reactor 200 as material is beings pumped from the first reactor 200 to the second reactor 300. The reaction may be terminated by introducing a deactivator (not shown) or, alternatively, the reaction may terminate naturally when all the monomer in the reactors are consumed. Preferably excess alpha olefin monomers are present during polymerization and deactivator is added to the reactant mixture to halt polymerization once the non-crystalline, ultra-high molecular weight polyalphaolefin is formed. As an additional option and additional feature of this specific embodiment of the invention, the reaction may be continued by forwarding the formed polyalphaolefin and other remaining materials to a pressurized storage vessel (not shown) where the molecular weight of the formed polyalphaolefin may yet be further increased. The polyalphaolefin drag reducing agent may be introduced into a conduit to reduce frictional energy losses of the material flowing through the conduit.

EXAMPLES

A series of tests was conducted to demonstrate the superior properties of drag reducing agents made in accordance with the invention. Some of those tests are discussed below.

Example 1

Four different drag reducing agents were compared for their ability to increase flow of various hydrocarbons. For control purposes, all four drag reducing agents were formed from the same titanium trichloride [$(TiCl_3)_3$—$AlCl_3$—AKZO AA] as the transition metal catalyst. Each, however, was formed using a different co-catalyst mixture. Compositions "A" and "B" were polyalphaolefins made in accordance with the invention. Both were made using alkylaluminoxane as a co-catalyst. The co-catalyst mixture used to make composition "A" was isobutylaluminoxane (IBAO) and dibutylaluminum chloride (DIBAC); while the co-catalyst mixture used to make sample "B" was IBAO and diethylaluminum chloride (DEAC). In contrast, compositions "C" and "D" are commercially available drag reducing compositions, and were already prepared. Compositions "C" and "D" were made without use of an alkylaluminoxane.

Composition "A" was formed using 212 weight ppm based upon the weight of all the reactants in the reactant mixture of the same titanium trichloride [$(TiCl_3)_3$—$AlCl_3$—AKZO—AA]. The titanium trichloride was combined with 1,346 weight ppm isobutylaluminoxane (IBAO) and 851 weight ppm DIBAC as co-catalysts to form a catalyst system. The catalyst system was combined with $C_6$ (64,800 weight ppm) and $C_{12}$ (64,800 weight ppm) alpha olefin monomers and a solvent (KOCH Sure-Sol-150, 857,991 weight ppm) at a temperature of 10° C. in accordance with the invention and allowed to polymerize to form ultra-high molecular weight polyalphaolefins.

Composition "B" was formed using 300 weight ppm based upon the weight of all the reactants in the reactant mixture of the same titanium trichloride [$(TiCl_3)_3$—$AlCl_3$—AKZO—AA]. The titanium trichloride was combined with 1,657 weight ppm isobutylaluminoxane (IBAO) and 1,093 weight ppm DEAC as co-catalysts to form a catalyst system. The catalyst system was combined with $C_8$ (39,500 weight ppm) and $C_{14}$ (39,500 weight ppm) alpha olefin monomers and a solvent (KOCH Sure-Sol-150, 907,950 weight ppm) at a temperature of −5° C. in accordance with the invention and allowed to polymerize to form ultra-high molecular weight polyalphaolefins.

Each of the four DRA compositions (A–D) was measured for Percent Flow Increase, using three "test hydrocarbons," namely, Alaska North Slope crude oil (ANS), Bow River crude oil (BOW RIVER), and hexane. The BOW RIVER test hydrocarbon was a highly viscous crude oil from the IPL Pipeline in Canada. One inch (1") and ¼" hydraulic flow loops were used. The ¼" flow loop was used for the hexane. The 1" flow loop was used to test the ANS crude oil and BOW RIVER crude oils, which are so viscous that they do not generate turbulent flow in a ¼" flow loop. Each DRA composition was combined with one gallon of each of the test hydrocarbons, forming a total of twelve (12) DRA test samples. Each DRA test sample was added to 24 gallons of the corresponding test hydrocarbon and passed through the flow loop over a constant time interval based upon the total weight of the DRA test sample and corresponding test hydrocarbon. In accordance with the Percent Flow Increase test, the weight of each test hydrocarbon (with DRA) passing through the flow loop over a constant time interval was measured, and compared to the baseline weight of each test hydrocarbon (without DRA) passing through the same flow loop over the same constant time interval. Percent Flow Increase for each DRA composition was measured. As reflected in Tables I and II, the Percent Flow Increase for invention compositions "A" and "B" was substantially higher than the Percent Flow Increase for comparative compositions "C" and "D." For example. when placed in hexane, invention compositions "A" showed 48% improvement in Percent Flow Increase over that of Composition "D." Even more surprising, and also indicative of the superior drag reducing capabilities of the present invention in an actual commercial setting. Compositions "A" and "B" both increased the flow rate of BOW RIVER crude oil, while neither compositions "C" nor "D" were able to increase the flow of the BOW RIVER crude oil.

TABLE I

PERCENT FLOW INCREASE

| DRA | ANS @ 3 ppm | BOW RIVER @ 4.6 ppm | HEXANE @ 1 ppm |
|---|---|---|---|
| A | 15.0 | 3.0 | 40.1 |
| B | 12.0 | 5.5 | 37.5 |
| C[1] | 10.8 | −0.5 | 31.1 |
| D[2] | — | 0.0 | 27.1 |

[1]LIQUID POWER ™ commercial DRA from Conoco Inc.
[2]FLO-1005 ™ commercial DRA from Baker-Hughes, Inc.

TABLE II

IMPROVEMENT IN PERCENT FLOW INCREASE
FOR DRA "A" AND DRA "B IN HEXANE @ 1 ppm

| Comparison | Percent Improvement in Percent Flow Increase |
|---|---|
| A compared to C | 28.9 |
| A compared to D | 48.0 |
| B compared to C | 20.6 |
| B compared to D | 38.4 |

Example 2

Additional tests were conducted, again, to compare the drag reducing properties of the invention, made using alkylaluminoxane co-catalysts, with the drag reducing properties of commercial DRA compositions, made without alkylaluminoxane co-catalysts. These tests were conducted over a range of concentrations. As discussed below, the results were impressive.

Again, for control purposes, all four drag reducing agents were formed using the same transition metal catalyst, i.e., titanium trichloride [$(TiCl_3)_3$—$AlCl_3$—AKZO Type D], but different co-catalyst mixtures. The co-catalyst mixture for composition "E" was isobutylaluminoxane (IBAO) and dibutylaluminum chloride (DIBAC). The co-catalyst mixture for composition "F" was IBAO and diethylaluminum chloride (DEAC).

Composition "E" was formed using 212 weight ppm based upon the weight of all the reactants in the reactant mixture of the same titanium trichloride [$(TiCl_3)_3$—$AlCl_3$—AKZO—AA]. The titanium trichloride was combined with 1,346 weight ppm isobutylaluminoxane (IBAO) and 851 weight ppm DIBAC as co-catalysts to form a catalyst system. The catalyst system was combined with $C_6$ (64,800 weight ppm) and $C_{12}$ (64,800 weight ppm) alpha olefin monomers and a solvent (KOCH Sure-Sol-150, 857,991 weight ppm) at a temperature of 10° C. in accordance with the invention and allowed to polymerize to form ultra-high molecular weight polyalphaolefins.

Composition "F" was formed using 300 weight ppm based upon the weight of all the reactants in the reactant mixture of the same titanium trichloride [$(TiCl_3)_3$—$AlCl_3$—AKZO—AA]. The titanium trichloride was combined with 1,657 weight ppm isobutylaluminoxane (IBAO) and 1,093 weight ppm DEAC as co-catalysts to form a catalyst system. The catalyst system was combined with $C_8$ (39,500 weight ppm) and $C_{14}$ (39,500 weight ppm) alpha olefin monomers and a solvent (KOCH Sure-Sol-150, 907,950 weight ppm) at a temperature of −5° C. in accordance with the invention and allowed to polymerize to form ultra-high molecular weight polyalphaolefins.

Comparative compositions "G" and "H" were both made using co-catalysts that included diethylaluminum ethoxide. The tests were conducted using a ¼" flow loop in the same manner described above, with hexane as the test hydrocarbon in all cases. Percent Drag Reduction (% DR) was the basis for comparison.

Figure 4:
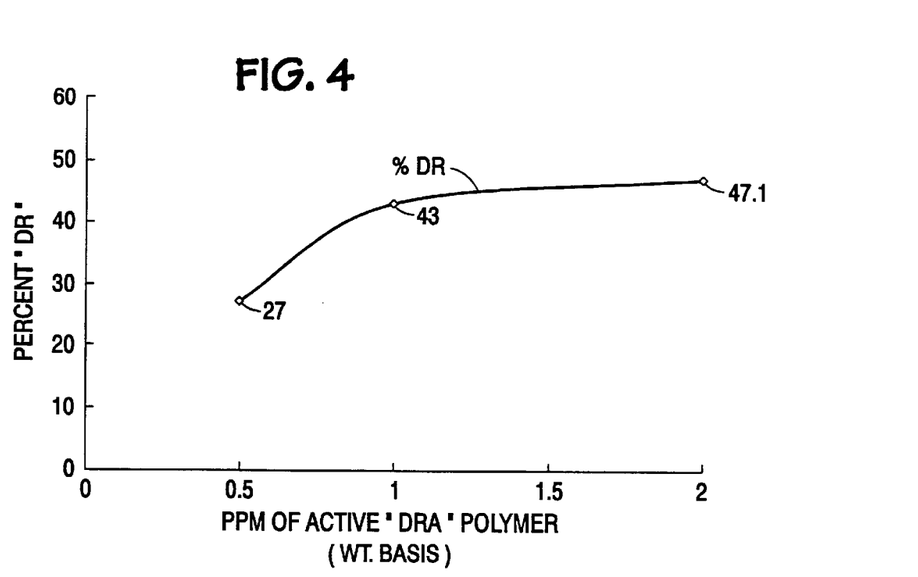
FIG. 4 is a DRA Performance Curve.
Figure 5:
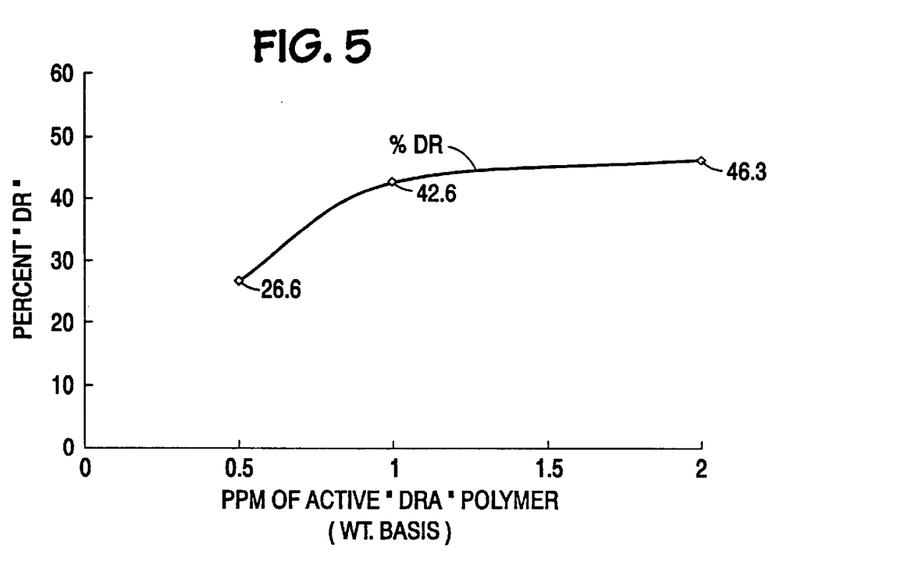
FIG. 5 is another DRA Performance Curve.
Figure 6:
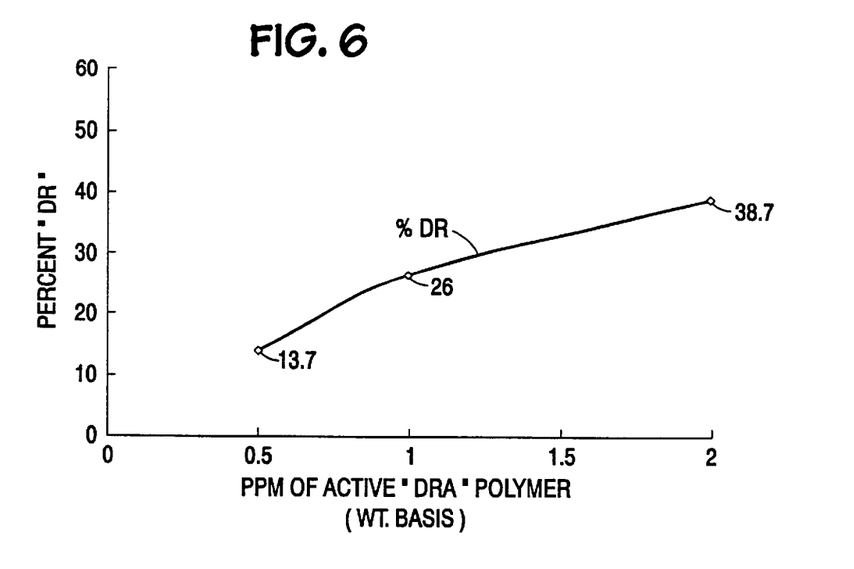
FIG. 6 is a comparative DRA Performance Curve.
Figure 7:
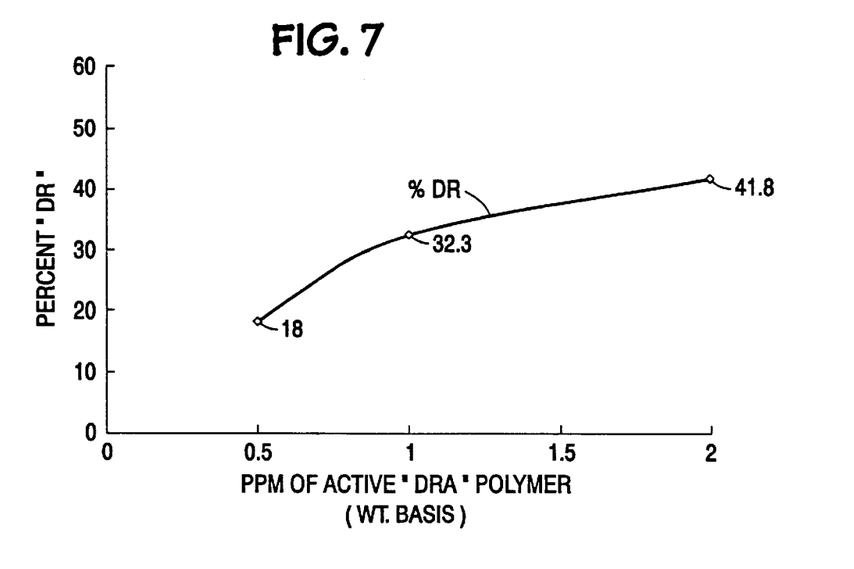
FIG. 7 is another comparative DRA Performance Curve.

Results are indicated in Tables III and IV. At the low end of the concentration range (0.5 ppm), the percent drag reduction was 27 and 26.6, respectively, for invention compositions "E" and "F." At that same concentration, the percent drag reductions for comparative compositions "G" and "H" were 13.7 and 18. Thus, at that concentration the invention DRAs improved drag reduction by almost 100% over the comparative DRAs. Even at higher concentrations (e.g., at 2.0 ppm), the invention DRAs still provided superior drag reduction. At DRA concentrations of 2.0 ppm, for example, compositions "E" and "F" still provided as much as 21.7% more drag reduction compared to compositions "G" and "H." Referring to FIGS. 4–7, it can be seen that over 2.0 ppm of the comparative drag reducing compositions (see compositions "E" and "F" in FIGS. 6 and 7 at 2.0 ppm) is required to achieve the same percent drag reduction provided by 1.0 ppm of the invention DRA (see compositions "C" and "D" in FIGS. 4 and 5). Based on those data, over twice as much non-invention DRA might be required to achieve the same level of drag reduction as invention DRA.

TABLE III

PERCENT DRAG REDUCTION

| | Concentration of DRA | | |
|---|---|---|---|
| DRA Composition | 0.5 ppm | 1.0 ppm | 2.0 ppm |
| E (FIG. 4) | 27.0 | 43.0 | 47.1 |
| F (FIG. 5) | 26.6 | 42.6 | 46.3 |
| G[1] (FIG. 6) | 13.7 | 26.0 | 38.7 |
| H[2] (FIG. 7) | 18.0 | 32.3 | 41.8 |

[1]LIQUID POWER ™ commercial DRA from Conoco Inc.
[2]FLO-1005 ™ commercial DRA from Baker-Hughes, Inc.

TABLE IV

PERCENT INCREASE IN DRAG REDUCTION

| | Concentration of DRA | | |
|---|---|---|---|
| Comparison | 0.5 ppm | 1.0 ppm | 2.0 ppm |
| E compared to G | 97.1 | 63.8 | 21.7 |
| E compared to H | 50.0 | 33.1 | 12.7 |
| F compared to G | 94.2 | 63.8 | 19.6 |
| F compared to H | 47.8 | 31.9 | 10.7 |

Example 3

In another specific embodiment of the invention, a drag reducing agent made using ethylene dichloride as a co-catalyst was prepared. This drag reducing agent, Composition "I", was formed using ethylene dichloride and isobutylaluminoxane as the co-catalysts.

Composition "I" was formed using 260 weight ppm based upon the weight of all the reactants in the reactant mixture of the same titanium trichloride [$(TiCl_3)_3$—$AlCl_3$—

AKZO—AA] as used in Examples 1 and 2. The titanium trichloride was combined with 2,815 weight ppm isobutylaluminoxane (IBAO) and 96 weight ppm ethylene dichloride as co-catalysts to form a catalyst system. The catalyst system was combined with $C_8$ (59,230 weight ppm) and $C_{14}$ (59,230 weight ppm) alpha olefin monomers and a solvent (KOCH Sure-Sol-150, 868,363 weight ppm) at a temperature of −5° C. in accordance with the invention and allowed to polymerize to form ultra-high molecular weight polyalphaolefins.

Composition "I" was compared to Compositions "G" and "H" of Example 2 to determine the effect using ethylene dichloride as a co-catalyst has on drag reduction. Composition "I" was also compared to Compositions "E" and "F" of Example 2 to determine the effect using ethylene dichloride as a co-catalyst has on polymerization time. i.e., the rate of polymerization of the alpha olefin monomers.

Composition "I" was measured for percent drag reduction by placing Composition "I" in hexane in a ¼" hydraulic flow loop as described in Example 1. Percent drag reductions are shown in Table V and percent increases in drag reduction are shown in Table VI. The rate of polymerization was determined by measuring the amount of time necessary for the polymerization reaction to form 5 weight percent polyalphaolefin based upon the total weight of the reactant mixture. The rates of polymerization are shown in Table VII.

TABLE V

PERCENT DRAG REDUCTION IN HEXANE @ 1 ppm

| DRA Composition | % DR |
|---|---|
| G (FIG. 6) | 26.0 |
| H (FIG. 7) | 32.3 |
| I | 34.7 |

TABLE VI

PERCENT INCREASE IN DRAG REDUCTION

| Comparison | % increase |
|---|---|
| I compared to G | 33.5 |
| I compared to H | 7.4 |

TABLE VII

POLYMERIZATION RATE TO FORM 5 wt % POLYALPHAOLEFIN

| DRA Composition | Hours |
|---|---|
| E | 22 |
| F | 36+[1] |
| I | 4.1 |

[1]Polymerization was terminated at 36 hours and polyalphaolefin concentration was 4 wt %.

As reflected in Tables VI and VII, Composition "I" provided not only superior drag reduction, but also a polymerization rate at least 3 times faster, when compared to drag reducing agents which do not utilize ethylene dichloride as a co-catalyst. As shown in Table VI, the percent drag reduction at 1 ppm DRA was 34.7 for invention Composition "I" compared to 26.0 and 32.3 for Compositions "G" and "H" respectively. Thus, at 1 ppm the invention DRA improved drag reduction by as much as 33% over the comparative DRAs.

Composition "I" also provided an effective drag reducing agent within a shorter period of time. In other words, by using ethylene dichloride as a co-catalyst, the polymerization rate increased at least three fold. As illustrated in Table VII, 5 weight percent polyalphaolefin based upon the total weight of the reactant mixture was formed in slightly more than 4 hours. Polymerization of alpha olefin monomers without using ethylene dichloride took at least 15 hours to form 5 weight percent polyalphaolefin.

These results show that Composition "I" is a superior drag reducing agent compared to drag reducing agents which are formed without using ethylene dichloride as a co-catalyst. These results further show that Composition "I" is formed at a rate of polymerization which is 3 to 4 times faster than the polymerization time necessary to form drag reducing agents which are not formed using ethylene dichloride. Accordingly, by using ethylene dichloride as a co-catalyst to from the drag reducing agents of the invention, the rate of polymerization can be increased, while providing a drag reducing agent which is superior to other drag reducing agents.

From these examples, it can be seen that the at least certain embodiments of the present invention provide superior properties when compared to other drag reducing agents. As mentioned above, while the examples reflect specific embodiments of the invention, the following claims, including their equivalents, will define the scope of the protected invention.

What is claimed is:

1. A process for forming a substantially non-crystalline, ultra-high molecular weight polyolefin comprising:

contacting olefin monomers with a catalyst system in a reactant mixture, wherein the catalyst system includes a transition metal catalyst and a halohydrocarbon co-catalyst; and polymerizing the olefin monomers at a temperature at about or less than 25° C., wherein during the polymerization, at least a portion of the olefin monomers polymerize in the reactant mixture to provide a non-crystalline, ultra-high molecular weight polyolefin.

2. The process of claim 1, wherein the catalyst system includes an alkylaluminoxane.

3. The process of claim 2, wherein the alkylaluminoxane is selected from the group consisting of methylaluminoxane and isobutylaluminoxane.

4. The process of claim 1, wherein the olefin monomers are alpha olefin monomers.

5. The process of claim 4, wherein the alpha olefin monomers include at least one of 1-hexene, 1-octene, 1-decene, 1-dodecene, or mixtures thereof.

6. The process of claim 4, wherein the alpha olefin monomers include a combination of 1-hexene and 1-dodecene alpha olefin monomers or a combination of 1-octene and 1-tetradodecene alpha olefin monomers.

7. The process of claim 1, wherein the polymerization is terminated by adding a deactivator to the reactant mixture after at least a portion of the olefin monomers polymerize in the reactant mixture to provide the non-crystalline, ultra-high weight polyolefin.

8. The process of claim 1, wherein the olefin monomers are polymerized by bulk polymerization.

9. The process of claim 1, wherein the transition metal catalyst includes titanium trichloride.

10. The process of claim 1, wherein the catalyst system further includes diethylaluminum chloride or dibutylaluminum chloride.

11. The process of claim 1, wherein the reactant mixture includes at least one hydrocarbon solvent.

12. The process of claim 11, wherein the olefin monomers and polyolefin remain substantially dissolved in the hydrocarbon solvent during polymerization.

13. The process of claim 1, wherein the polymerization of the olefin monomers continues such that polyolefin is present in the reactant mixture at a concentration of at least about 4 weight percent based upon the weight of the reactant mixture and the polyolefin includes an inherent viscosity of at least about 10 deciliters.

* * * * *